United States Patent
Oury

[11] 3,945,484
[45] Mar. 23, 1976

[54] SINGLE BELT, MULTIPLE CONVEYOR SYSTEM

[75] Inventor: Robert F. Oury, Elmhurst, Ill.

[73] Assignee: Rotec Industries, Elmhurst, Ill.

[22] Filed: July 15, 1974

[21] Appl. No.: 488,697

Related U.S. Application Data

[63] Continuation-in-part of Ser. No. 366,983, June 4, 1973, and a continuation-in-part of Ser. No. 329,361, Feb. 5, 1973.

[52] U.S. Cl.............................. 198/139; 198/192 R
[51] Int. Cl.²......................................... B65G 15/22
[58] Field of Search ............ 198/139, 134, 202, 65, 198/233, 192

[56] References Cited
UNITED STATES PATENTS

| | | | |
|---|---|---|---|
| 1,953,862 | 4/1934 | Menk................................... | 198/139 |
| 2,983,364 | 5/1961 | Lo Presti ............................ | 198/202 |
| 3,598,224 | 8/1971 | Oury..................................... | 198/65 |
| 3,826,353 | 7/1974 | Greasley............................. | 198/139 |

FOREIGN PATENTS OR APPLICATIONS

| | | | |
|---|---|---|---|
| 1,267,843 | 6/1961 | France................................ | 198/139 |

Primary Examiner—James B. Marbert
Attorney, Agent, or Firm—Allegretti, Newitt, Witcoff & McAndrews

[57] ABSTRACT

In a multiple, variable length conveyor system having at least two conveyor frames, one conveyor frame movable parallel to the other frame, a single, slack-free conveyor belt is positioned in combination with both frames and passes in a continuous loop forward from the back of the top conveyor to the front thereof, back from the front of the top conveyor to the back of bottom conveyor, forward from the back of the bottom conveyor to the front thereof and back over the front of the top conveyor to the back thereof to complete the loop. This single belt system permits relative movement between the conveyor frames from a collapsed state to an extended state and obviates the need for separate conveyor belts for each conveyor frame. This system is particularly applicable to multiple, variable length conveyors for conveying concrete such as multiple conveyors positioned above the extendible boom of a crane-type wheeled vehicle. In the extended state, a portion of the belt is carried along the bottom conveyor on substantially non-binding idler assemblies which permit the engagement and disengagement of the conveyor belt and bottom conveyor during movement between the collapsed and extended states of operation.

11 Claims, 6 Drawing Figures

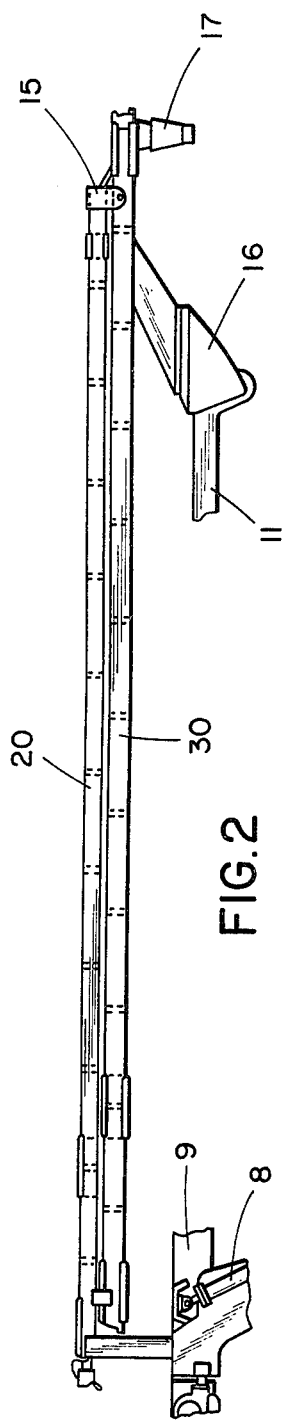
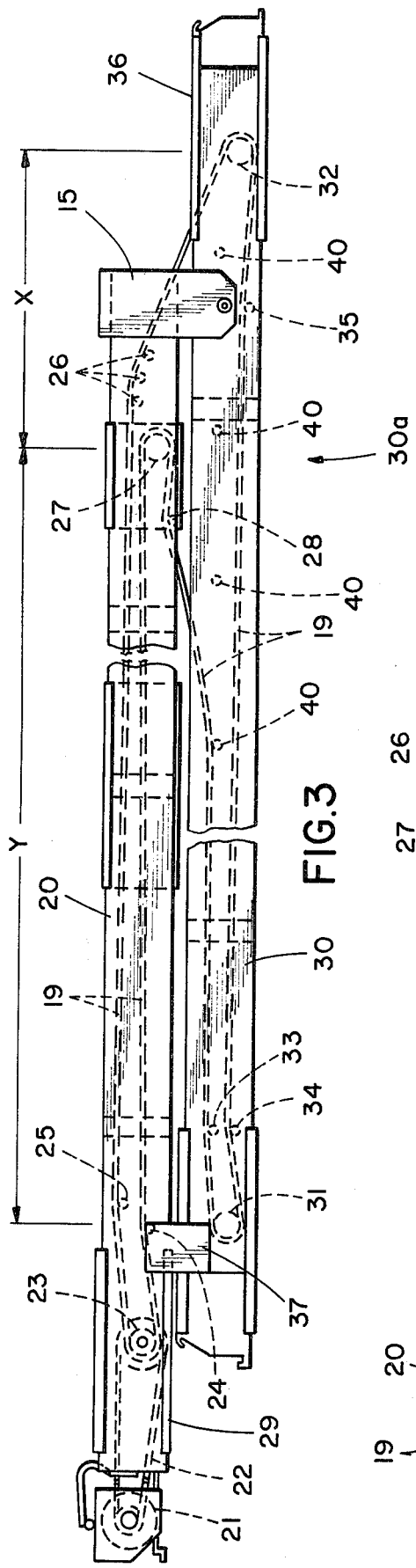

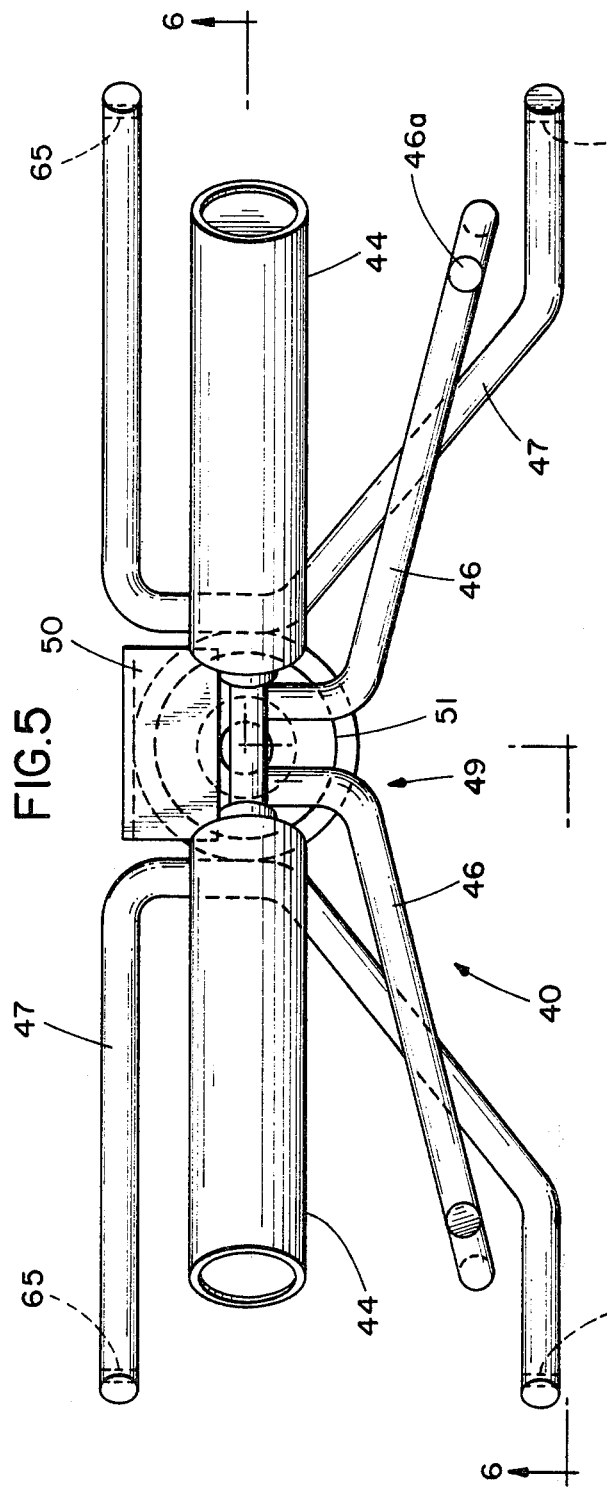
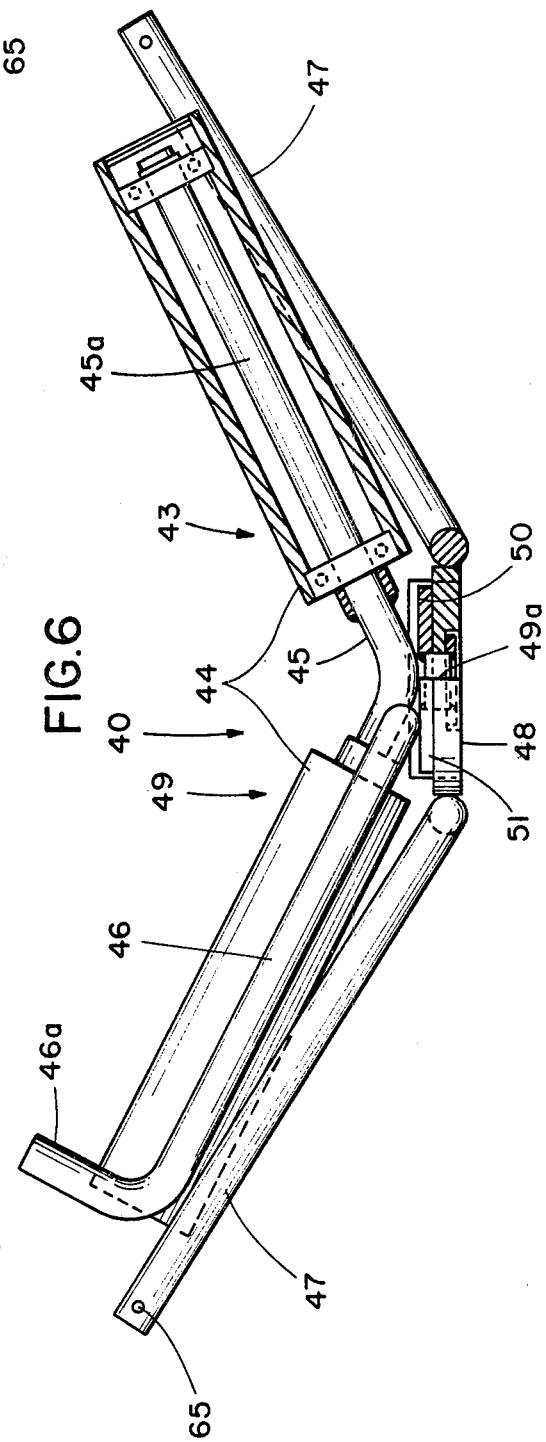

SINGLE BELT, MULTIPLE CONVEYOR SYSTEM

RELATED APPLICATIONS

This application is a continuation-in-part application, related to Ser. No. 366,983, filed June 4, 1973, and Ser. No. 329,361, filed Feb. 5, 1973.

BACKGROUND OF THE INVENTION

The present invention relates generally to a multiple conveyor system and, more particularly, to a multiple conveyor system having at least two parallel, superimposed, movable conveyor frames.

A variable length conveyor system embodying at least two independent conveyor belts on separate superimposed conveyor frames is illustrated in my U.S. Pat. No. 3,598,224, the teachings of which are incorporated by reference herein. In this system, at least two conveyors are supported above an extendible boom of a conventional crane-type wheeled vehicle. A main conveyor is rigidly affixed to the main, immovable portion of the extensible boom and is equipped with an endless conveyor belt driven by a suitable motor. Positioned between the main conveyor and the extensible portion of the boom and rigidly affixed thereto is a second, separate conveyor frame containing a separate conveyor belt and drive motor. The lower extensible conveyor moves back and forth parallel to the main conveyor in response to the extension and retraction of the extendible boom. During this movement, at least a portion of the extendible conveyor is positioned below the discharge end of the main conveyor to receive materials such as concrete as they are discharged from the main conveyor. In this regard, the materials must fall substantially directly downward from the main conveyor to the extendible conveyor.

This conveyor system has some disadvantages which, while not interfering with the basic purposes of the system, result in a somewhat more expensive and bulkier system. For example, in the conventional conveyor system, each of the conveyors utilizes a separate motor and drive system. As a consequence, when the boom is fully extended, suitable wires and controls must be provided to extend from the crane control cab to the motor on the extensible conveyor frame now substantially extended outward. Further, when the boom is extended in this outward position, the motor weight of the extensible conveyor frame must be counteracted by the weight of the crane chassis to prevent the entire system from tipping forward. In other words, as a result of the motor for the extensible conveyor frame being positioned a substantial distance from the center of gravity of the entire crane system, outriggers or other suitable counterweights must be provided to maintain stability for the entire system. In addition, there is substantial cost and weight associated with the electric lines and hydraulic hoses that are necessary to power the motor for the extensible conveyor.

A further disadvantage of the prior art multiple conveyor system is that concrete, as it falls or is thrown from the main conveyor down onto the extensible conveyor, often has the tendency to bounce from the second conveyor belt. To prevent excessive loss of the concrete, scrapers and baffles have been positioned near the discharge point of the main conveyor. These baffles, etc., result in a perfect drop of the concrete between conveyors but, as in the case of the separate motor for the extensible conveyor, result in an increased mass at a point substantially removed from the center of gravity of the vehicle per se. Again this results in either lower capacity on the conveyors and/or suitable counterweights or outriggers on the vehicle.

Although single belt - single motor extendible conveyor systems are presently known, these systems are generally unacceptable for the transfer of semifluid materials, such as concrete. Such a system is shown in Brevet D'Invention No. 1,267,843 (delivery date July 13, 1960).

These systems are unacceptable because the conveyor belt must remain flat throughout the conveyor run. As such, a semifluid material would run off the edges of the belt. A flat conveyor belt is necessary to permit engagement and disengagement of the belt and the various supporting idler assemblies of the conveyor system during movement between a retracted and extended state.

Modification of such systems to permit semifluid material transfer is also prohibited. The presently known idler assemblies, utilized in concrete-carrying conveyor systems, do not permit belt engagement and disengagement without forfeiture of belt alignment capabilities.

SUMMARY OF THE INVENTION

It is thus an object of this invention to provide an improved, variable length, multiple conveyor system, particularly for conveying concrete.

It is another object of this invention to provide an improved means for discharging concrete from one conveyor to a lower conveyor to substantially avoid spillage of the conveyed material.

It is a specific object of this invention to provide a variable length multiple conveyor system employing only one common conveyor belt.

It is an additional object of this invention to provide a variable length, multiple conveyor system mounted on a crane-type, wheeled vehicle which has improved weight distribution properties when the conveyors and boom are extended.

It is a further object of the present invention to provide a single belt conveyor system that is self-adjusting to compensate for belt misalignment.

It is yet another object of the present invention to provide a conveyor system including an improved idler assembly for maintaining proper alignment of the conveyor belt.

It is still another object of the present invention to provide an improved idler assembly which facilitates engagement and disengagement of the belt during extension and retraction of the movable conveyor frame.

In a specific embodiment, therefore, the present invention relates to an improvement in multiple, variable length conveyor apparatus for conveying material such as concrete having at least a first and second conveyor frame, such as a lower conveyor frame and at least one superjacent, parallel conveyor frame. At least one of the conveyor frames is movable parallel to the other frame between a collapsed or retracted state and at least one extended state.

The particular improvement comprises a single, relatively slack-free, conveyor belt positioned and guided on the conveyor frames in a continuous loop. In this loop, the conveyor belt passes from the back of the first conveyor frame to the front thereof, from the front of the first conveyor frame to the back of the second conveyor frame, forward from the back of the second conveyor frame to the front thereof and back past the front of the first conveyor frame to the back of the first conveyor frame in the manner of a folded-over loop. Preferably, a motor to drive the entire belt conveyor is positioned at the rear portion of the upper conveyor frame. The conveyor frames can be superimposed as indicated or the second conveyor frame can telescope within the first conveyor frame.

In another embodiment, the present invention relates to an improved self-adjusting, non-binding idler assembly for a conveyor belt comprising a rotatable roller assembly and means for rotating the roller assembly in response to lateral movement of the conveyor belt on the idler assembly. The roller assembly includes a pair of rollers which support the belt and define a substantially V-shaped trough. Significantly, the roller assembly and rotating means cooperatively define means for freely engaging and disengaging the belt and the idler assembly.

In the specific embodiment described above, the non-binding, V-shaped idler assemblies are secured along a forward portion of the lower extendible conveyor to support a concrete-bearing portion of the single, continuous conveyor belt in the extended state. As the lower conveyor is extended and retracted, the conveyor belt engages and disengages, respectively, to idler assemblies. The roller assemblies, in the extended state, rotate in response to belt misalignment to automatically guide the conveyor belt towards the center of the V-shaped trough.

The improved self-adjusting, non-binding idler assembly also has significant application in concrete conveyor systems utilizing a plow mechanism to scrape the concrete from the conveyor belt at the desired location. This type of system is illustrated and described, in detail, in my U.S. Pat. No. 3,590,983, the teachings of which are incorporated by reference herein. In this environment, the improved idler assembly facilitates the lifting and lowering of the conveyor belt by the plow mechanism, while simultaneously and continuously compensating for belt misalignment.

Other embodiments, objects, and advantages of the present invention will become apparent in the following detailed description.

BRIEF DESCRIPTION OF THE DRAWING

A preferred embodiment of the present invention will be described in detail with reference to the drawing wherein:

FIG. 2 is a side elevational view of the preferred embodiment shown in FIG. 1 illustrating the conveyor frames and extensible boom;

FIG. 3 is a detailed side elevational view of the preferred embodiment of FIG. 1 shown in a collapsed, retracted state and illustrating the orientation of the conveyor belt within the multiple, variable length conveyor frames;

FIG. 4 is a detailed side elevational view of the preferred embodiment of FIG. 3 shown in an extended state;

FIG. 5 is a detailed, enlarged top view of a self-adjusting, non-binding idler assembly for use in the preferred embodiment shown in FIG. 1; and FIG. 6 is a detailed, enlarged front view of the idler assembly shown in FIG. 5.

DETAILED DESCRIPTION OF INVENTION

Figure 1:
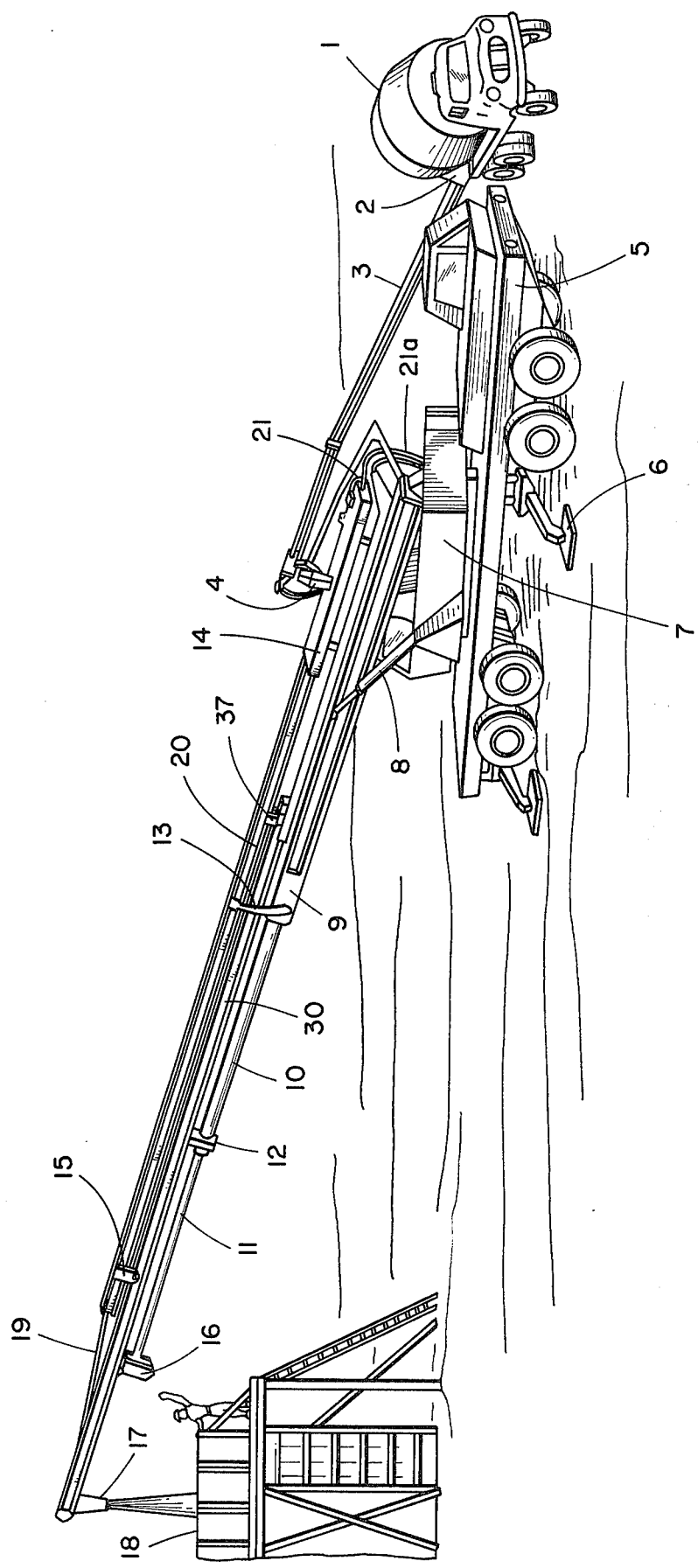
FIG. 1 is a perspective view of a typical crane-type wheeled vehicle supporting a preferred embodiment of the present invention shown as a single belt, variable length, multiple conveyor system.

Referring to FIGS. 1 and 2, there is illustrated a boom mounted, variable length, multiple conveyor system similar to the apparatus described in my U.S. Pat. No. 3,598,224, the teachings of which are incorporated by reference herein. This apparatus comprises a crane-type wheeled vehicle 5 equipped with outriggers 6 to provide stability during a continuous material delivery operation. A rotatable base 7, capable of rotating 360°, is positioned on the rear portion of vehicle 5. An extendible boom comprising fixed section 9 and extendible sections 10 and 11 is mounted on rotatable base 7 and is elevated by a conventional hydraulic piston 8 to various heights encountered on a construction project.

Upper fixed conveyor frame 20 is rigidly affixed to fixed boom section 9 by support yolk 14 and intermediate support arm 13. Lower extendible conveyor frame 30 is positioned between upper, fixed conveyor frame 20 and boom sections 9, 10 and 11 by front support members 15 and 16, intermediate support member 12, and rear support member 37. In particular, lower extendible conveyor frame 30 is rigidly affixed to the forward end of extendible boom member 11 by support member 16 and is movably supported by upper fixed conveyor frame 20 by movable support members 15 and 37. Since this method of support is fully detailed in my U.S. Pat. No. 3,598,224, for purposes of brevity and simplicity, a detailed description of these supports is not included herein and reference may be had to that patent for the specific details of each support.

A single, substantially slack-free conveyor belt 19 is positioned on upper fixed conveyor frame 20 and lower extendible conveyor frame 30. The orientation of the belt 19 will be discussed in detail hereinafter.

In actual operation, concrete is discharged from a concrete truck 1 through a discharge chute 2 to a supply conveyor 3. Supply conveyor 3 delivers the concrete in a continuous fashion to supply hopper 4 wherein the concrete is discharged from conveyor 3 through hopper 4 onto conveyor belt 19 as it is supported by conveyor frame 20. The concrete is then continuously conveyed forward by belt 19 from upper fixed conveyor frame 20 to lower extendible conveyor frame 30 and through tremie 17 into form 18. During the course of this operation, the entire conveyor system can be swung from side to side by rotation of rotatable base 7, raised or lowered by the action of hydraulic piston 8, or entended or retracted by operation of sections 10 and 11 of the boom. When the boom is extended (retracted), lower extendible conveyor 30 moves forward (backward) beneath upper fixed conveyor 20. During the entire continuous delivery operation, conveyor belt 19 is driven by a single motor 21 positioned near the rear of upper fixed conveyor frame 20 and is powered and controlled by conventional electric and hydraulic lines 21a.

The exact orientation of conveyor belt 19 within the conveyor frames 20 and 30 in both a collapsed and extended state is shown in FIGS. 3 and 4. Upper fixed conveyor frame 20 houses rear drive pulley 23, intermediate, lower conveyor belt support rollers 24 and 28, fixed forward guide pulley 27, upper support roller 25 and triple idler roller 26. These pulley and roller assemblies generally comprise at least three rollers arranged transversely across the conveyor frame 20 to provide a substantially trough-shaped conveyor belt. This arrangement is illustrated in detail in FIG. 6 of my U.S. Pat. No. 3,598,224. Rear drive pulley 23 is mounted on adjustable support bracket 29 which is rigidly affixed to frame 20 by suitable bolts and clamps. Pulley 23 is powered by drive motor 21 through drive chain 22.

In a similar manner, lower extendible conveyor frame 30 houses a fixed rear guide pulley 31, forward guide pulley 32 and intermediate support idler rollers 33, 34 and 35. Fixed forward guide pulley 32 is mounted on adjustable brackets 36 in the same manner as rear drive pulley 23 and is adjustable in combination with pulley 23 to provide a relatively slack-free conveyor belt 19 wherein no excess belt is stored within the conveyor frames 20, 30.

As shown, the lower extendible conveyor frame 30 also includes a series of self-adjusting idler assemblies 40. The idler assemblies 40 are equally spaced along a forward end portion, generally designated 30a, of the lower conveyor frame 30. The idler assemblies 40 will be described in detail below.

In the collapsed or retracted state shown in FIG. 3, the single conveyor belt 19 passes from rear drive pulley 23 over support roller 24, around forward fixed guide pulley 27 before passing over support roller 28. The belt 19 then passes down to lower extendible conveyor frame 30 and contacts at least one idler assembly 40 and support roller 33 before passing around fixed rear pulley 31. The belt 19 then proceeds to pass over support idler rollers 34 and 35 before passing around fixed forward guide pulley 32. After passing around pulley 32, belt 19 passes back up to upper fixed conveyor frame 20 and into contact with triple idler rollers 26. Triple idler rollers 26 support belt 19 above forward guide pulley 27 and prevent the belt 19 from interfering with that portion of the belt 19 positioned on pulley 27. The belt 19 then passes from triple idler rollers 26 back to rear drive pulley 23 to complete the loop. Adjustable support brackets 29 and 36 are movable backwards and forwards on their respective frames so that the tension in conveyor belt 19 can be properly adjusted and maintained.

As the lower extendible conveyor frame 30 moves to the position shown in FIG. 4, the distance, X, between forward pulleys 27 and 32 increases. Simultaneously, however, the distance, Y, between rear pulley 31 and forward pulley 27 decreases to an equal extent. As a result, the extension or advancement of the lower extendible conveyor 30 is permitted by the slack created between forward pulley 27 and rear pulley 31. Thus, no matter what the position of lower extendible conveyor 30, the total distance between pulleys 23, 27, 31 and 32 remains constant and the belt 19 remains relatively slack-free at all times.

In the extended state, shown in FIG. 4, a concrete-bearing portion, generally designated 19a, of the conveyor belt 19 is carried and supported by at least one idler assembly 40. The idler assemblies 40 are preferably spaced at intervals of approximately 15 to 20 feet.

Referring to FIGS. 5 and 6, each idler assembly 40 includes a base member 48 and a rotatable support member or roller assembly 49. A pair of bent, substantially V-shaped support rods 47 are rigidly connected to and extend from the base member 48.

The support rods 47 have openings 65 at each end thereof. The support rods 47 extend through suitable openings in sides of lower conveyor frame 30 and are held in position by pins (not shown) inserted through the openings 65.

The roller assembly 49 is rotatably secured to the base member 48 about a substantially vertical axis, designated 49a. The roller assembly 49 includes a mount 51, a substantially V-shaped rod 45, and a pair of idler rollers 44. The rod 45 is secured to the mount 51 and has a pair of upwardly and outwardly extending arms 45a. The arms 45a act as axes for the rollers 44, such that the rollers 44 define a substantially V-shaped trough in which the conveyor belt 19 rides. On the rollers 44, the belt 19 itself is generally V-shaped, although the central portion of the belt 19 may be rounded or substantially flat.

The roller assembly 49 also includes a pair of substantially L-shaped rods 46, including upwardly turned end portions 46a, rigidly secured to the mount 51. As shown in FIG. 5, the L-shaped rods 46 extend from the mount 51 substantially aligned with and parallel to the arms 45a of the V-shaped rod 45. A spacer 50 also secured to the mount 51 between the L-shaped rods 46, effectively limits the rotation of the roller assembly 49 by engagement with the support rods 47.

Rotation of the idler assembly 40 about the axis 49a compensates for and substantially avoids any lateral deflection or tendency of the conveyor belt 19 to ride out of the V-shaped trough formed by the rollers 44. In operation, when conveyor belt 19 inadvertently moves to one direction, i.e., becomes misaligned, the edge of the belt 19 engages an end portion 46a of the L-shaped rod 46, causing one roller 44 to shift forward by the rotation of the roller assembly 49. This change in orientation of the rollers 44 with respect to the belt 19 creates a natural cant in the direction of the belt 19 and a directional force which induces the belt 19 to move to the center of the V-shaped idler assembly 40, thereby providing a self-adjusting alignment feature. As a result of this self-adjusting feature, the weight of the concrete remains in the proper center position of the belt trough and there is substantially no loss of drive power to the belt 19 through motor 21.

In addition, the idler assembly 40 significantly facilitates movement, i.e., extension and retraction, of the lower conveyor frame 30. As the lower conveyor frame 30 is extended to the position shown in FIG. 4, the conveyor belt 19 engages the idler assemblies 40, one by one. Similarly, as the lower conveyor frame 30 is retracted, the belt 19 disengages the idler assemblies 40, one by one.

The arrangement of rollers 44 and L-shaped guide rods 46 readily permits engagement and disengagement of the belt 19 and idler assembly 40, without any substantial forfeiture of the self-training characteristics of the idler assembly 40. That is, the roller assembly 49 does not interfere in any substantial way with the raising (disengagement) of the belt 19 during retraction or the lowering (engagement) of the belt 19 during extension of the lower conveyor frame 30. Thus, the idler assembly 40 is non-binding as opposed to the presently known self-adjusting idler assemblies which tend to catch or trap the conveyor belt 19 as it is withdrawn therefrom.

As a whole, the single belt variable length, multiple conveyor systems illustrated and described herein provides several operating advantages. First, the rather bulky, heavy, drive motor 21 is positioned directly over vehicle 5 and aids in the stability of the unit when the conveyors are fully extended. Further, the single conveyor that cooperates with conveyor frames 20 and 30 is driven by a single motor 21. This eliminates the weight associated with the cables and power unit that would otherwise be associated with conveyor frame 30 as in the prior art system.

Another advantage of the single belt system is the gradual decline from fixed conveyor frame 20 to lower extendible conveyor frame 30 as provided by triple idler rollers 26. In operation, idler rollers 26 support conveyor belt 19 and provide a gradual decline in the belt as it passes from conveyor frame 20 to conveyor frame 30. Accordingly, during a concrete delivery operation, the concrete and the rocks contained therein are not thrown from the conveyor belt during a high-speed materials delivery operation. A further advantage is that the single belt unit utilizes a relatively slack-free belt not requiring the storage of excess belt in the apparatus as the conveyor frames extend and retract. Still another advantage is the freedom of the movement of the extendible lower conveyor frame 30, as provided by the non-binding idler assemblies.

A single preferred embodiment of the present invention has been described herein. It is to be understood, however, that various changes and modification can be made without departing from the true scope and spirit of the present invention as defined by the following claims.

What is claimed is:

1. In a variable length conveyor apparatus for conveying concrete including at least a first and second conveyor frame, said first conveyor frame having a first forward portion and a first rear portion, said second conveyor frame having a second forward portion, a second rear portion and a longitudinal axis, said second conveyor frame being adapted to move relative to said first conveyor frame between a collapsed, retracted state and at least one extended state, the improvement comprising in combination:

a single, continuous, and substantially slack-free conveyor belt positioned on said first and second conveyor frames;

means for guiding said conveyor belt about said first and second conveyor frames, said guiding means defining a closed path wherein said conveyor belt passes forward from the first rear portion to the first forward portion, forward from said first forward portion to said second forward portion, back from said second forward portion to said second rear portion, forward from said second rear portion to said first forward portion, and back from said first forward portion to said first rear portion, said closed path having a substantially constant length in said collapsed and extended states, said conveyor belt defining a concrete-bearing portion along said second forward portion of said second conveyor frame in said extended state; and at lease one non-binding, self-training idler assembly positioned on said second forward section, said idler assembly including a base member, means for rigidly securing said base member to said second conveyor frame substantially along said longitudinal axis, a roller assembly rotatably secured to said base member to support said concrete-bearing portion of said conveyor belt said rotatable roller assembly having a pair of rollers defining a substantially V-shaped trough and a pair of rods secured to said rotatable roller assembly substantially parallel to said pair of rollers, respectively, said rod including an upwardly turned end portion, said rods cooperatively defining means for rotating said roller assembly in response to lateral movement of said conveyor belt to align said conveyor belt with said idler assembly and second conveyor frame, said rollers and said rotating means cooperatively defining means for freely engaging and disengaging said conveyor belt and idler assembly during movement of said second conveyor frame relative to said first conveyor frame between said collapsed and extended states.

2. An improvement as claimed in claim 1 including a single motor positioned near said first rear portion of said first conveyor frame to drive said conveyor belt.

3. An improvement as claimed in claim 1 wherein said first conveyor frame is an upper conveyor frame and said second conveyor frame is a lower conveyor frame positioned below said first conveyor frame, said first conveyor frame being fixed relative to said second conveyor frame.

4. An improvement as claimed in claim 3 wherein said guiding means includes a plurality of spaced-apart idler rollers secured to said first forward portion of said first conveyor frame, said idler rollers gradually descending from the top of said first conveyor frame toward the bottom thereof, said idler rollers supporting said conveyor belt as it passes from said first conveyor frame downwards to said second conveyor frame, whereby said conveyor belt smoothly descends to said second conveyor frame and spillage of said concrete is substantially avoided.

5. An improvement as claimed in claim 1 wherein said guiding means includes first, second, third and fourth guide rollers movably secured to said forward and rear portions of said first and second conveyor frames, said first, second, third and fourth guide rollers cooperatively defining means for adjusting the tension of said conveyor belt.

6. An idler assembly for use in a conveyor system having a frame and belt comprising in combination:

a base member rigidly secured to said frame at substantially the center thereof;

a roller assembly rotatably secured to said base member, said roller assembly including a pair of rollers to support said belt, said rollers defining a substantially V-shaped trough having a trough center; and means for rotating said roller assembly in response to lateral movement of said belt within said V-shaped trough, said rotating means including a pair of rods secured to said roller assembly and extending therefrom in substantially parallel relationship to said rollers whereby said belt is automatically and substantially aligned with said trough center, said rollers and said rotating means cooperating to define means for freely engaging and disengaging said belt with said idler assembly.

7. An idler assembly as claimed in claim 6 wherein said rod includes an upwardly turned end portion, said belt engaging said end portion whenever said belt moves laterally within said V-shaped trough, said roller assembly rotating in response to the engagement of said belt and end portion and forcing said belt toward said trough center of said V-shaped trough to substantially compensate for misalignment of said belt.

8. An idler assembly as claimed in claim 6 wherein said roller assembly is rotatable about a substantially vertical axis.

9. An idler assembly as claimed in claim 6 further comprising means for limiting the rotation of said roller assembly.

10. In a concrete-carrying conveyor system of the type having a frame and a plow mechanism to scrape concrete from a conveyor belt, an improved idler assembly comprising in combination:
- a base member rigidly secured to said frame in substantially the center thereof; and
- a roller assembly rotatably secured to said base member, said roller assembly including a pair of rollers to support said belt, said rollers defining a substantially V-shaped trough having a trough center, and a pair of rods extending substantially parallel to said pair of rollers, respectively, said rod having an upwardly turned end;

said rods cooperatively defining means for rotating said roller assembly in response to lateral movement of said belt within said V-shaped trough, whereby said belt is automatically and substantially aligned with said trough center, said rollers and said rotating means cooperating to define means for freely engaging and disengaging said belt with said idler assembly.

11. An improved idler assembly as claimed in claim 10, wherein said belt engages said end portion whenever said belt moves laterally within said V-shaped trough, said roller assembly rotating in response to the engagement of said belt and end portion and to force said belt toward said trough center and substantially compensate for misalignment of said belt.

* * * * *